US008630653B2

(12) United States Patent
Ahn et al.

(10) Patent No.: US 8,630,653 B2
(45) Date of Patent: Jan. 14, 2014

(54) METHOD OF PERFORMING RANDOM ACCESS PROCEDURE IN WIRELESS COMMUNICATION SYSTEM

(75) Inventors: Seung Jin Ahn, Anyang-si (KR); Woo Seong Kim, Anyang-si (KR); Mu Ryong Kim, Anyang-si (KR); Seung Woo Nam, Anyang-si (KR); Dae Won Lee, Anyang-si (KR); Kwang Il Kim, Anyang-si (KR); Su Hwan Lim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 636 days.

(21) Appl. No.: 12/318,582

(22) Filed: Dec. 31, 2008

(65) Prior Publication Data

US 2009/0186613 A1 Jul. 23, 2009

Related U.S. Application Data

(60) Provisional application No. 61/020,399, filed on Jan. 11, 2008.

(30) Foreign Application Priority Data

Jan. 4, 2008 (KR) .......................... 10-2008-0001293
Apr. 10, 2008 (KR) .......................... 10-2008-0033253

(51) Int. Cl.
*H04W 4/00* (2009.01)
(52) U.S. Cl.
USPC ........... 455/450; 455/522; 375/260; 370/331; 370/329
(58) Field of Classification Search
USPC ................. 370/329, 336, 349, 350; 375/260; 455/522, 561
See application file for complete search history.

(56) References Cited

U.S. PATENT DOCUMENTS

| 2006/0027142 | A1* | 2/2006 | Huang ........................... 106/437 |
| 2006/0111119 | A1* | 5/2006 | Iochi .............................. 455/450 |
| 2006/0126573 | A1 | 6/2006 | Dick et al. |
| 2006/0217142 | A1* | 9/2006 | Inaba ............................ 455/522 |
| 2007/0206531 | A1* | 9/2007 | Pajukoski et al. ............. 370/329 |
| 2007/0230600 | A1 | 10/2007 | Bertrand |
| 2008/0273610 | A1* | 11/2008 | Malladi et al. ................ 375/260 |
| 2008/0311919 | A1* | 12/2008 | Whinnett et al. ............. 455/447 |
| 2009/0201891 | A1* | 8/2009 | Lee et al. ...................... 370/336 |
| 2010/0197315 | A1* | 8/2010 | Lindstrom et al. ............ 455/450 |

FOREIGN PATENT DOCUMENTS

| TW | 200644680 A | 12/2006 |
| TW | 200830902 A | 7/2008 |
| WO | 2007083230 A2 | 7/2007 |
| WO | WO 2007/091811 A1 | 8/2007 |

OTHER PUBLICATIONS

Motorola, "Random Access Procedure" 3GPP RAN1 LTE Adhoc, Cannes, France, May 8-12, 2006, R1-061708, XP050111538.
LG Electronics, "Impacts on UL for Control of HS-FACH" 3GPP TSG-RAN WG2 #56bis, Sorrento, Italy, Nov. 15-Jan. 19, 2007, R2-070285, XP050133374.
3GPP TSG-RAN WG2 #56bis, Tdoc R2-070164, Jan. 19, 2007.

\* cited by examiner

*Primary Examiner* — Ajit Patel
*Assistant Examiner* — Myron K Wyche
(74) *Attorney, Agent, or Firm* — McKenna Long & Aldridge LLP

(57) ABSTRACT

A method includes transmitting a random access preamble, receiving a random access response as a response of the random access preamble, wherein the random access response comprises an uplink resource assignment and a request for transmission of a Channel Quality Indicator (CQI), and transmitting the CQI in the uplink resource assignment.

8 Claims, 26 Drawing Sheets

METHOD OF PERFORMING RANDOM ACCESS PROCEDURE IN WIRELESS COMMUNICATION SYSTEM

CROSS-REFERENCE TO RELATED APPLICATIONS

This application claims the benefit of priority of U.S. Provisional application Ser. No. 61/020,399 filed on Jan. 11, 2008, Korean Patent Application No. 10-2008-0001293 filed on Jan. 4, 2008, and Korean Patent Application No. 10-2008-0033253 filed on Apr. 10, 2008 which are incorporated by reference in its entirety herein.

BACKGROUND

1. Technical Field

The present invention relates to wireless communications, and more particularly, to a method of performing a random access procedure in a wireless communication system.

2. Related Art

Third generation partnership project (3GPP) mobile communication systems based on a wideband code division multiple access (WCDMA) radio access technology are widely spread all over the world. High-speed downlink packet access (HSDPA) that can be defined as a first evolutionary stage of WCDMA provides 3GPP with a radio access technique that is highly competitive in the mid-term future. However, since requirements and expectations of users and service providers are continuously increased and developments of competing radio access techniques are continuously in progress, new technical evolutions in 3GPP are required to secure competitiveness in the future.

An orthogonal frequency division multiplexing (OFDM) system capable of reducing inter-symbol interference with a low complexity is taken into consideration as one of next generation (after the third generation) systems. In the OFDM, a data stream is transmitted by being carried on a plurality of subcarriers. The subcarriers maintain orthogonality in a frequency dimension. Each orthogonal subcarrier experiences independent frequency selective fading. Inter-symbol interference can be removed by using a cyclic prefix (CP).

Orthogonal frequency division multiple access (OFDMA) is a multiple access scheme in which multiple access is achieved by independently providing some of available subcarriers to a plurality of users. In the OFDMA, frequency resources (i.e., subcarriers) are provided to the respective users, and thus the respective frequency resources are independently provided to the plurality of users.

A user equipment (UE) generally performs a random access procedure to access to a network. The random access procedure is performed to adjust uplink synchronization or to request an uplink radio resource assignment. For one example, the UE may perform the random access procedure to acquire uplink synchronization after adjusting downlink synchronization when power is initially turned on. For another example, in a state where a radio resource control (RRC) connection is not established, the UE may perform the random access procedure so that uplink radio resources are allocated for uplink transmission. For another example, the UE may perform the random access procedure so that initial access to a target base station (BS) is achieved in a handover procedure.

Since the random access procedure is an initialization procedure for uplink transmission or for network access, delay or failure in the random access procedure causes a service delay.

Accordingly, there is a need for a method capable of performing the random access procedure in a more rapid and reliable manner.

SUMMARY

The present invention provides a method of performing a reliable random access procedure in a wireless communication system.

The present invention also provides a method which enables reliable data transmission.

In an aspect, a method of performing a random access procedure in a wireless communication system carried out in a user equipment is provided. The method includes transmitting a random access preamble, receiving a random access response as a response of the random access preamble, wherein the random access response comprises an uplink resource assignment and a request for transmission of a Channel Quality Indicator (CQI), and transmitting the CQI in the uplink resource assignment.

In some embodiments, the random access response may be transmitted on a Physical Downlink Shared Channel (PDSCH). The PDCCH may be indicated by a Physical Downlink Control Channel (PDCCH) addressed by a Random Access-Radio Network Temporary Identifier (RA-RNTI). The random access response may be a Medium Access Control (MAC) Protocol Data Unit (PDU). The CQI may be transmitted on a Physical Uplink Shared Channel (PUSCH) and may be time first mapped in the uplink resource assignment. The random access preamble may be a dedicated random access preamble.

In another aspect, a user equipment includes a Radio Frequency (RF) unit for transmitting and receiving radio signals, and a processor coupled with the RF unit and configured to transmit a random access preamble, receive a random access response as a response of the random access preamble, wherein the random access response comprises an uplink resource assignment and a request for transmission of a CQI, and transmit the CQI in the uplink resource assignment.

In still another aspect, a method of performing a random access procedure in a wireless communication system carried out in a base station is provided. The method includes receiving a random access preamble, and transmitting a random access response as a response of the random access preamble, wherein the random access response comprises an uplink resource assignment and a request for transmission of a CQI.

In still another aspect, a method of performing a random access procedure in a wireless communication system carried out in a user equipment is provided. The method includes transmitting a random access preamble in a random access resource, and receiving a random access response on a PDSCH indicated by a physical downlink control channel (PDCCH), wherein a cyclic redundancy check (CRC) in the PDCCH is masked with a random access identifier which is associated with the random access resource.

In some embodiments, the random access identifier may be a Random Access-Radio Network Temporary Identifier (RA-RNTI). The size of the RA-RNTI may be 16 bits. The random access response may comprise a random access preamble identifier corresponding to the random access preamble. The method may further include determining the random access identifier by using a subframe index of a subframe for the random access resource and a resource index of the random access resource in the subframe. A subframe for the PDCCH may be subsequent to a subframe for the random access resource. The random access response comprises an uplink resource assignment.

In still another aspect, a user equipment includes a RF unit for transmitting and receiving a radio signal, and a processor coupled with the RF unit and configured to transmit a random access preamble in a random access resource, monitor at least one PDCCH to find a random access response, and receive the random access response on a PDSCH indicated by a PDCCH when no CRC error of the PDCCH is detected, wherein a CRC in the PDCCH is masked with a random access identifier which is associated with the random access resource.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. The UTRA is a part of a universal mobile telecommunication system (UMTS). Third generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the 3GPP LTE/LTE-A. However, technical features of the present invention are not limited thereto.

Figure 1:
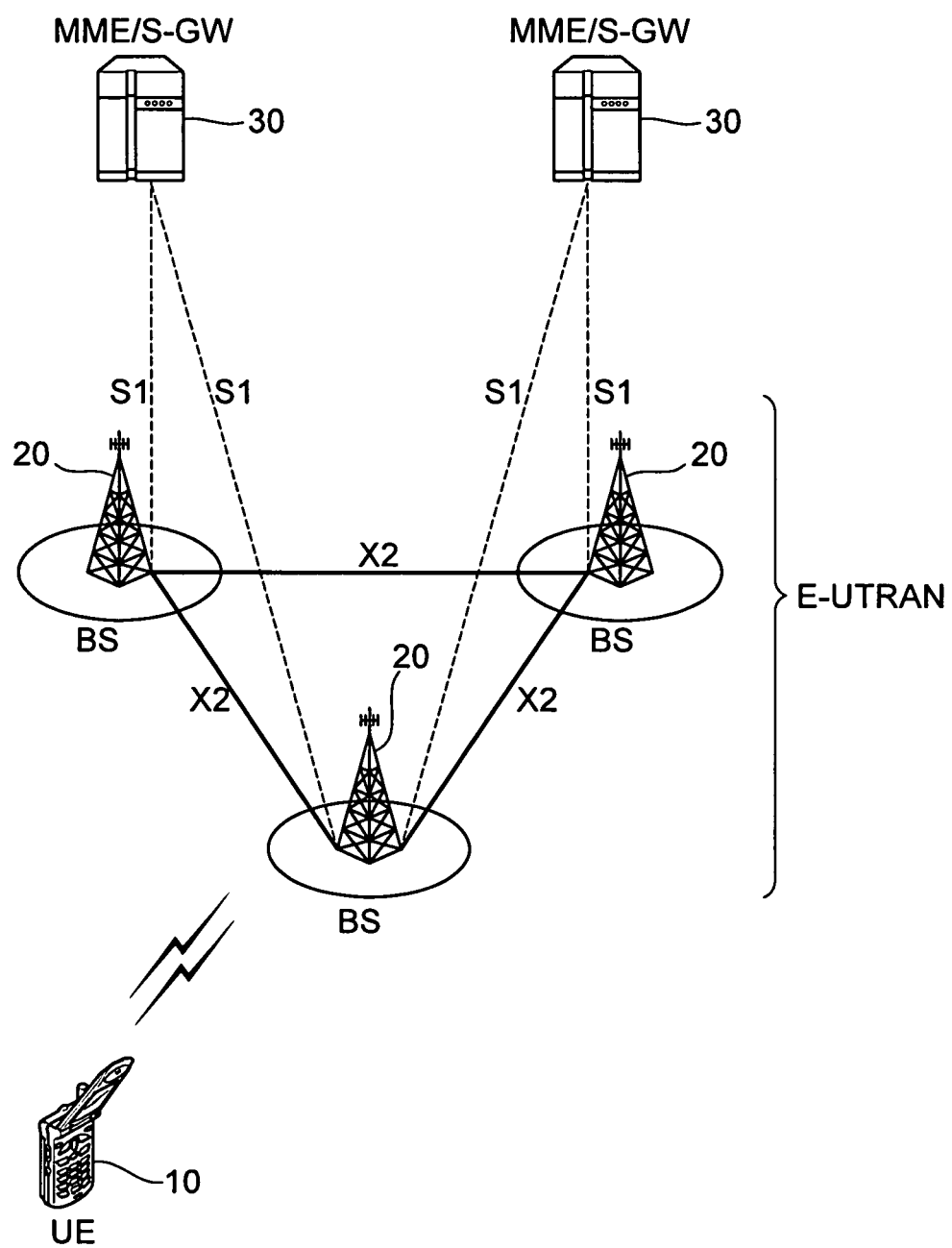
FIG. 1 shows a structure of a wireless communication system.

FIG. 1 shows a structure of a wireless communication system. The wireless communication system may have a network structure of an evolved-universal mobile telecommunications system (E-UMTS). The E-UMTS may be also referred to as a long term evolution (LTE) system. The wireless communication system can be widely deployed to provide a variety of communication services, such as voices, packet data, etc.

Referring to FIG. 1, an evolved-UMTS terrestrial radio access network (E-UTRAN) includes at least one base station (BS) 20 which provides a control plane and a user plane.

A user equipment (UE) 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as an evolved node-B (eNB), a base transceiver system (BTS), an access point, etc. There are one or more cells within the coverage of the BS 20. Interfaces for transmitting user traffic or control traffic may be used between the BSs 20. Hereinafter, a downlink is defined as a communication link from the BS 20 to the UE 10, and an uplink is defined as a communication link from the UE 10 to the BS 20.

The BSs 20 are interconnected by means of an X2 interface. The BSs 20 are also connected by means of an S1 interface to an evolved packet core (EPC), more specifically, to a mobility management entity (MME)/serving gateway (S-GW) 30. The S1 interface supports a many-to-many relation between the BS 20 and the MME/S-GW 30.

Figure 2:
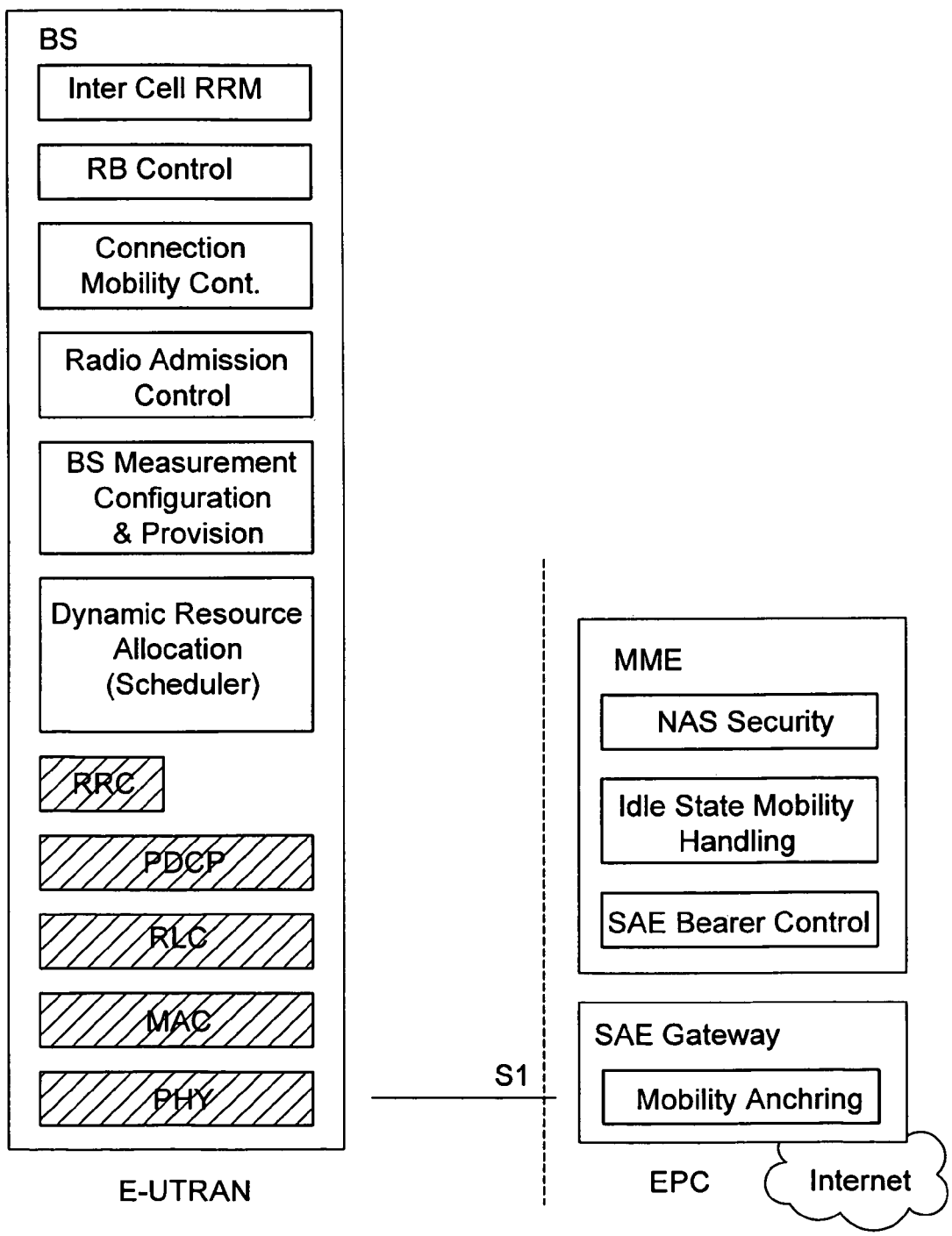
FIG. 2 is a diagram showing functional split between an evolved universal terrestrial radio access network (E-UTRAN) and an evolved packet core (EPC).

FIG. 2 is a diagram showing functional split between the E-UTRAN and the EPC.

Referring to FIG. 2, slashed boxes depict radio protocol layers and white boxes depict functional entities of the control plane.

The BS performs the following functions: (1) functions for radio resource management (RRM) such as radio bearer control, radio admission control, connection mobility control, and dynamic allocation of resources to the UE; (2) Internet protocol (IP) header compression and encryption of user data streams; (3) routing of user plane data to the S-GW; (4) scheduling and transmission of paging messages; (5) scheduling and transmission of broadcast information; and (6) measurement and measurement reporting configuration for mobility and scheduling.

The MME performs the following functions: (1) distribution of paging messages to BSs; (2) security control; (3) idle state mobility control; (4) system architecture evolution (SAE) bearer control; and (5) ciphering and integrity protection of non-access stratum (NAS) signaling.

The S-GW performs the following functions: (1) termination of user plane packet for paging; and (2) user plane switching for the support of UE mobility.

Figure 3:
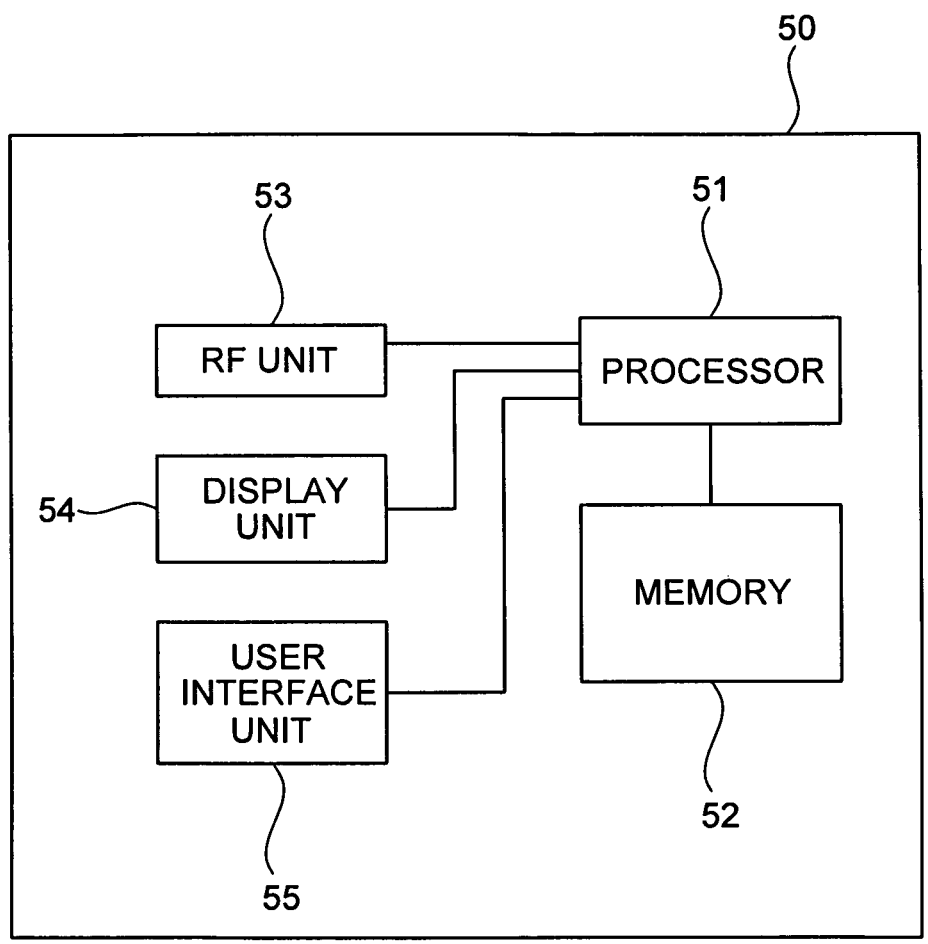
FIG. 3 is a block diagram showing constitutional elements of a user equipment.

FIG. 3 is a block diagram showing constitutional elements of the UE. A UE 50 includes a processor 51, a memory 52, a radio frequency (RF) unit 53, a display unit 54, and a user interface unit 55. Layers of the radio interface protocol are implemented in the processor 51. The processor 51 provides the control plane and the user plane. The following methods can be implemented in the processor 51. The memory 52 is coupled to the processor 51 and stores various parameters to perform a random access procedure and handover. The display unit 54 displays a variety of information of the UE 50 and may use a well-known element such as a liquid crystal display (LCD), an organic light emitting diode (OLED), etc. The user interface unit 55 can be configured with a combination of well-known user interfaces such as a keypad, a touch screen, etc. The RF unit 53 is coupled to the processor 51 and transmits and/or receives radio signals.

Layers of a radio interface protocol between the UE and the network can be classified into a first layer (L1), a second layer (L2), and a third layer (L3) based on the lower three layers of the open system interconnection (OSI) model that is well-known in the communication system. A physical layer, or simply a PHY layer, belongs to the first layer and provides an information transfer service through a physical channel. A radio resource control (RRC) layer belongs to the third layer and serves to control radio resources between the UE and the network. The UE and the network exchange RRC messages via the RRC layer.

Figure 4:
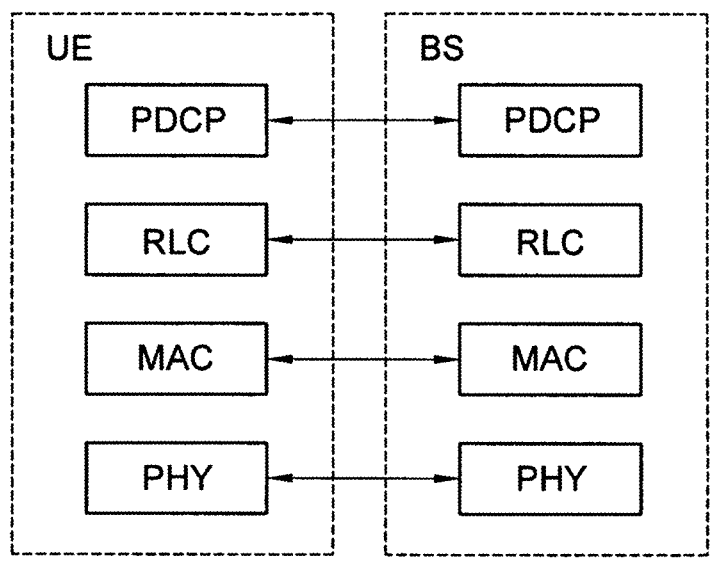
FIG. 4 is a diagram showing a radio protocol architecture for a user plane.
Figure 5:
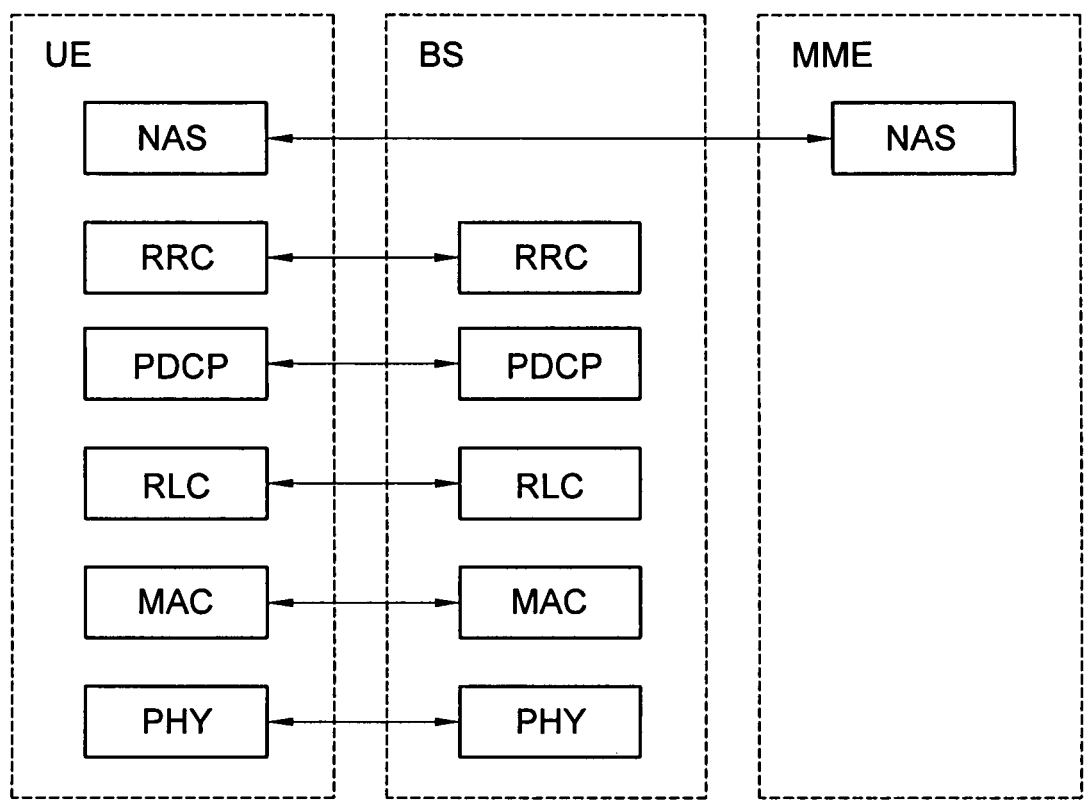
FIG. 5 is a diagram showing a radio protocol architecture for a control plane.

FIG. 4 is a diagram showing a radio protocol architecture for the user plane. FIG. 5 is a diagram showing a radio protocol architecture for the control plane. They illustrate the architecture of a radio interface protocol between the UE and the E-UTRAN. The user plane is a protocol stack for user data transmission. The control plane is a protocol stack for control signal transmission.

Referring to FIGS. 4 and 5, a PHY layer belongs to the first layer and provides an upper layer with an information transfer service through a physical channel. The PHY layer is coupled with a medium access control (MAC) layer, i.e., an upper layer of the PHY layer, through a transport channel. Data is transferred between the MAC layer and the PHY layer through the transport channel. Between different PHY layers (i.e., a PHY layer of a transmitter and a PHY layer of a receiver), data is transferred through the physical channel. In the PHY layer, modulation is performed using an orthogonal frequency division multiplexing (OFDM) scheme and time and frequency can be utilized as a radio resource.

The MAC layer belongs to the second layer and provides services to a radio link control (RLC) layer, i.e., an upper layer of the MAC layer, through a logical channel. The RLC layer in the second layer supports reliable data transfer. There are three operating modes in the RLC layer, that is, a transparent mode (TM), an unacknowledged mode (UM), and an acknowledged mode (AM) according to a data transfer method. An AM RLC provides bidirectional data transmission services and supports retransmission when the transfer of the RLC protocol data unit (PDU) fails.

A packet data convergence protocol (PDCP) belonging to the second layer performs header compression function. When transmitting an Internet protocol (IP) packet such as an IPv4 packet or an IPv6 packet, the header of the IP packet may contain relatively large and unnecessary control information. The PDCP layer reduces the header size of the IP packet so as to efficiently transmit the IP packet.

A radio resource control (RRC) layer belongs to the third layer and is defined only in the control plane. The RRC layer serves to control the logical channel, the transport channel, and the physical channel in association with configuration, reconfiguration and release of radio bearers (RBs). An RB is a service provided by the second layer for data transmission between the UE and the E-UTRAN. When an RRC connection is established between an RRC layer of the UE and an RRC layer of the network, it is called that the UE is in an RRC connected mode. When the RRC connection is not established yet, it is called that the UE is in an RRC idle mode.

A non-access stratum (NAS) layer belongs to an upper layer of the RRC layer and serves to perform session management, mobility management, or the like.

Data is transmitted from the network to the UE through a downlink transport channel. Examples of the downlink transport channel include a broadcast channel (BCH) for transmitting system information and a downlink-shared channel (DL-SCH) for transmitting user traffic or control messages. User traffic of downlink multicast or broadcast service or control messages can be transmitted on the DL-SCH or a downlink multicast channel (MCH). Data is transmitted from the UE to the network through an uplink transport channel. Examples of the uplink transport channel include a random access channel (RACH) for transmitting an initial control message and an uplink-shared channel (UL-SCH) for transmitting user traffic or control message.

The BS manages radio resources of one or more cells. One cell is configured to have one of bandwidths selected from 1.25, 2.5, 5, 10, and 20 megahertz (MHz) and provides downlink or uplink transmission services to a plurality of UEs. In this case, different cells can be configured to provide different bandwidths. Cell configuration can be achieved in such as manner that multiple cells geographically overlap by using different frequencies. The BS informs the UE of basic information for network access by using system information. The system information includes necessary information which needs to be known to the UE so as to access to the BS. Therefore, the UE has to completely receive the system information before accessing to the BS and always has to maintain latest system information. Since the system information has to be known to all UEs within one cell, the BS periodically transmits the system information.

Examples of logical channels mapped onto the transport channels include a broadcast channel (BCCH), a paging control channel (PCCH), a common control channel (CCCH), a multicast control channel (MCCH), a multicast traffic channel (MTCH), a dedicated control channel (DCCH), etc.

Figure 6:
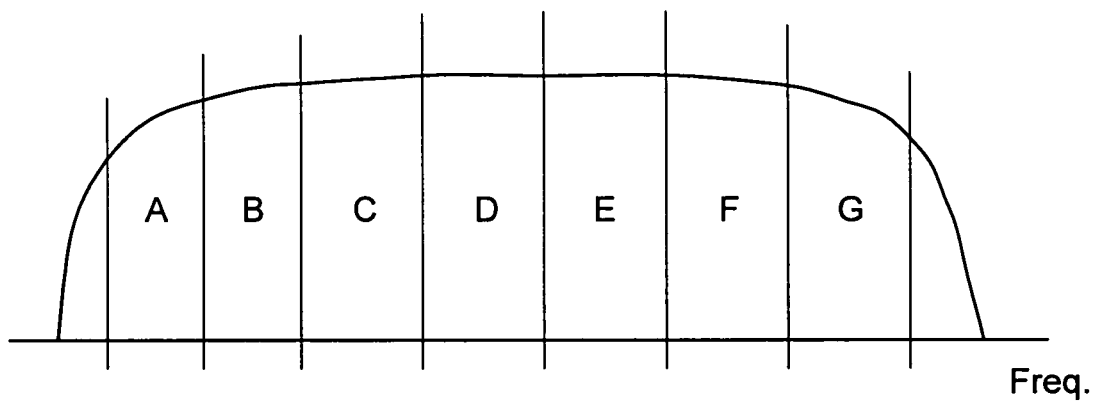
FIG. 6 shows an example of frequency selective scheduling in orthogonal frequency division multiple access (OFDMA).

FIG. 6 shows an example of frequency selective scheduling in OFDMA. Most suitable frequency bands are allocated to UEs A to G in a whole frequency band. The size of each band or the number of bands may differ according to a channel condition between a UE and a BS. The BS schedules the UEs by receiving channel information (e.g., a channel quality indicator (CQI)) from each UE.

Figure 7:
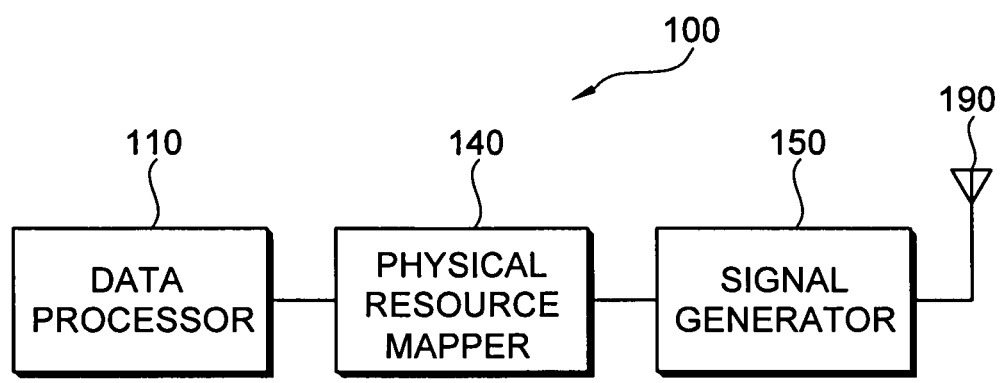
FIG. 7 is a block diagram showing a transmitter using a single carrier frequency division multiple access (SC-FDMA) scheme.

FIG. 7 is a block diagram showing a transmitter using an SC-FDMA scheme.

Referring to FIG. 7, a transmitter 100 includes a data processor 110, a physical resource mapper 140, and a signal generator 150. The data processor 110 processes user data and a CQI to generate complex-valued symbols. Functions of a MAC layer or an RRC layer in addition to a physical layer can be implemented by the data processor 110. Functions of the physical layer or other layers can be implemented by an additional processor.

The physical resource mapper 140 maps the complex-valued symbols onto physical resources. The physical resources may be resource elements or subcarriers. The signal generator 150 generates time-domain signals to be transmitted through a transmit antenna 190. The signal generator 150 may generate the time-domain signals by using the SC-FDMA scheme. The time-domain signal output from the signal generator 150 is referred to as an SC-FDMA symbol or an OFDMA symbol Although it will be assumed hereinafter that the signal generator 150 uses the SC-FDMA scheme, this is for exemplary purposes only. Thus, the present invention may also apply to other multiple-access schemes. For example, the present invention may apply to various multiple-access schemes such as OFDMA, code division multiple access (CDMA), time division multiple access (TDMA), and frequency division multiple access (FDMA).

Figure 8:
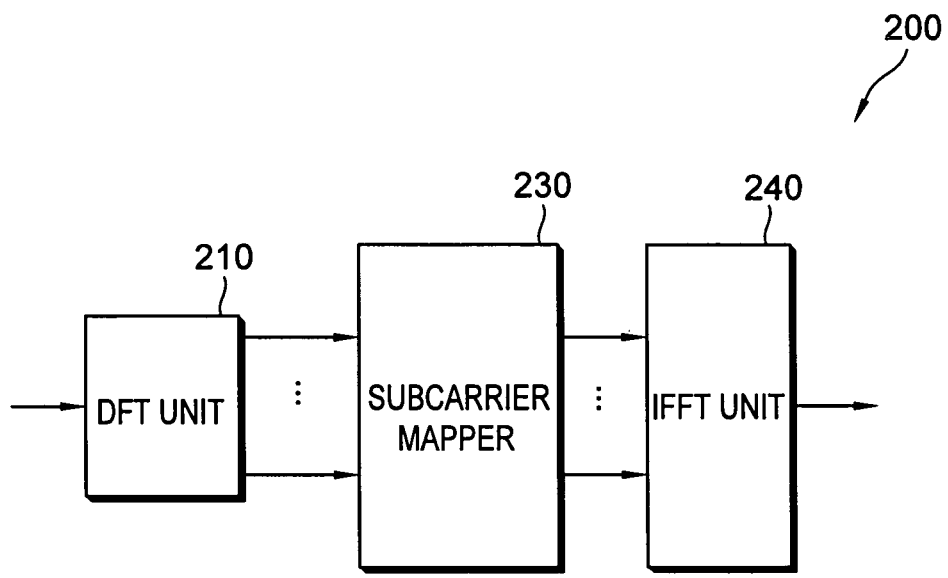
FIG. 8 is a block diagram showing a signal generator using an SC-FDMA scheme.

FIG. 8 is a block diagram showing a signal generator using an SC-FDMA scheme.

Referring to FIG. 8, a signal generator 200 includes a discrete Fourier transform (DFT) unit 210 that performs a DFT, a subcarrier mapper 230, and an inverse fast Fourier transform (IFFT) unit 240 that performs an IFFT. The DFT unit 210 performs the DFT on input data and thus outputs frequency-domain symbols. The subcarrier mapper 230 maps the frequency-domain symbols onto respective subcarriers. The IFFT unit 230 performs the IFFT on input symbols and thus outputs time-domain signals.

Figure 9:
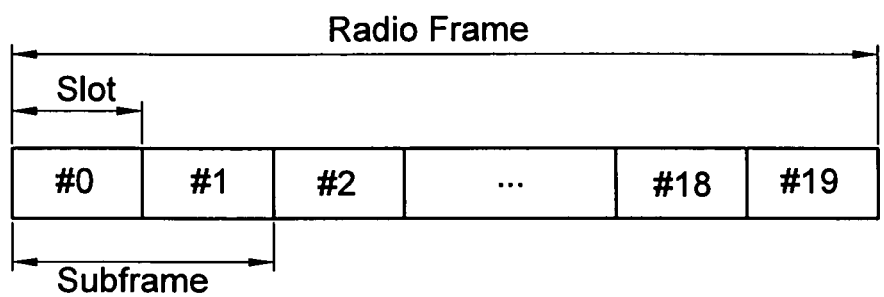
FIG. 9 shows a structure of a radio frame in a third generation partnership project (3GPP) long term evolution (LTE).

FIG. 9 shows a structure of a radio frame in a 3GPP LTE.

Referring to FIG. 9, a radio frame includes 10 subframes. One subframe includes two slots. A time for transmitting one subframe is defined as a transmission time interval (TTI). For example, one subframe may have a length of 1 millisecond (ms), and one slot may have a length of 0.5 ms. One slot includes a plurality of SC-FDMA symbols in a time domain and a plurality of resource blocks in a frequency domain.

The structure of the radio frame is shown for exemplary purposes only. Thus, the number of subframes included in the radio frame or the number of slots included in the subframe or the number of SC-FDMA symbols included in the slot may change variously.

Figure 10:
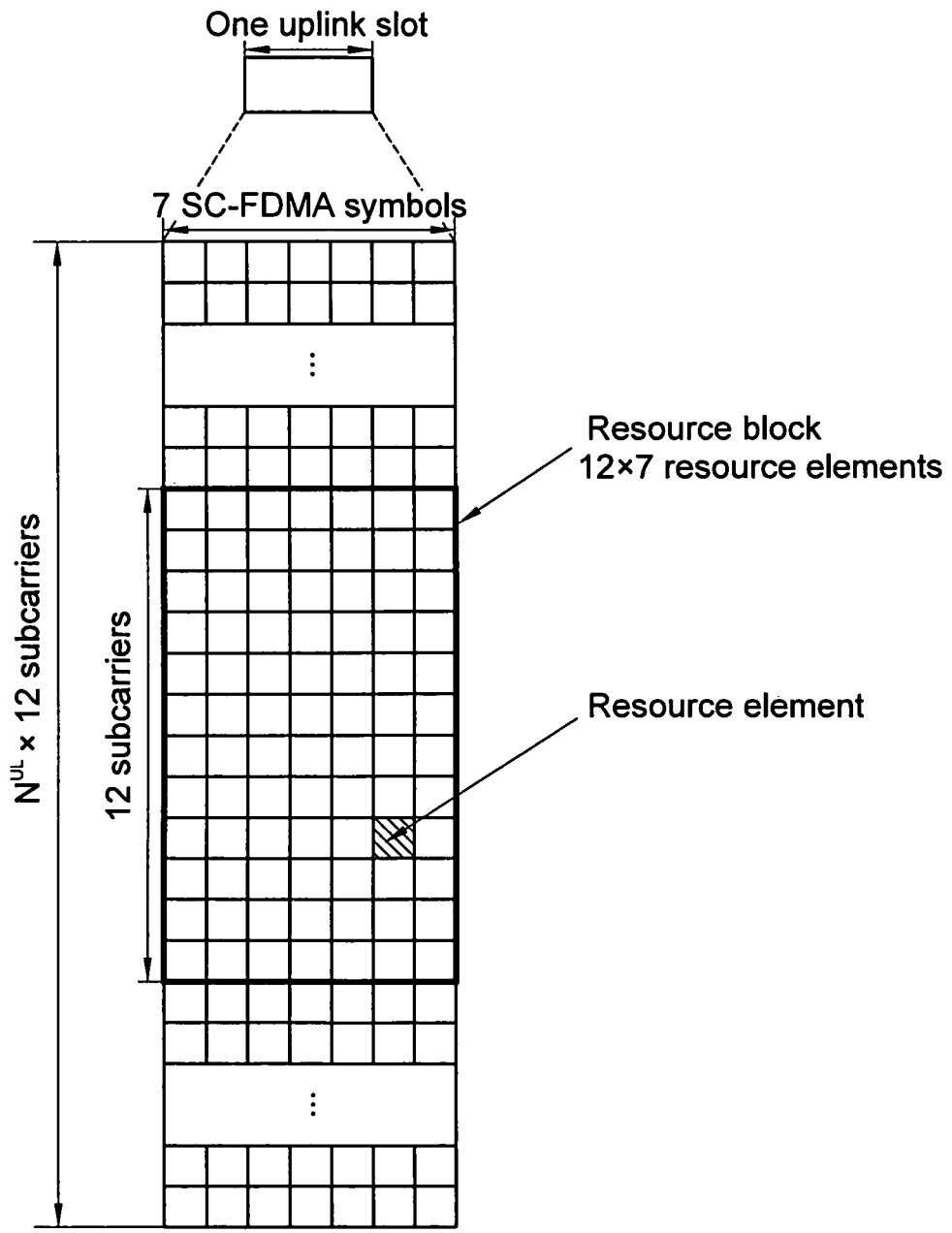
FIG. 10 shows an exemplary diagram showing a resource grid for one uplink slot.

FIG. 10 shows an exemplary diagram showing a resource grid for one uplink slot.

Referring to FIG. 10, an uplink slot includes a plurality of SC-FDMA symbols in a time domain and a plurality of resource blocks in a frequency domain.

Although it is described herein that one uplink slot includes 7 OFDM symbols and one resource block includes 12 subcarriers, this is for exemplary purposes only, and thus the present invention is not limited thereto.

Elements on the resource grid are referred to as resource elements. One resource block includes 12×7 resource elements. The number $N^{UL}$ of resource blocks included in the uplink slot depends on an uplink transmission bandwidth determined in a cell.

Figure 11:
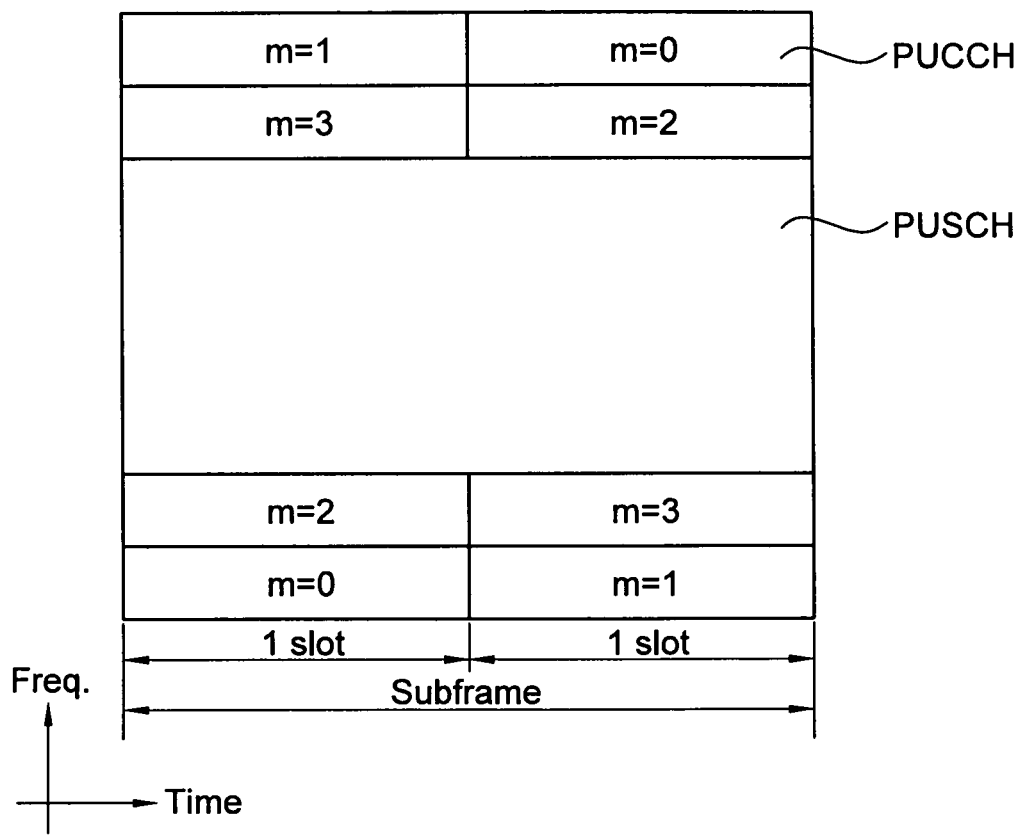
FIG. 11 shows a structure of an uplink subframe.

FIG. 11 shows a structure of an uplink subframe.

Referring to FIG. 11, the uplink subframe is divided into a region assigned to a physical uplink control channel (PUCCH) for carrying uplink control information and a region assigned to a physical uplink shared channel (PUSCH) for carrying user data. The region assigned to the PUCCH is referred to as a control region. The region assigned to the PUSCH is referred to as a data region. A middle portion of the subframe is assigned to the PUSCH. Both sides of the data region are assigned to the PUCCH. To maintain a single carrier property, one UE does not simultaneously transmit the PUCCH and the PUSCH.

The PUSCH is mapped with an uplink shared channel (UL-SCH) that is a transport channel, and carries user data and/or uplink control information.

Examples of the uplink control information transmitted on the PUCCH include an acknowledgment (ACK)/not-acknowledgement (NACK) signal used to perform hybrid automatic repeat request (HARQ), a channel quality indicator (CQI) indicating a downlink channel condition, a scheduling request signal used to request an uplink radio resource assignment, etc. The uplink control information can be transmitted on the PUCCH or the PUSCH.

The PUCCH for one UE uses one resource block which occupies a different frequency in each of two slots in the subframe. The two slots use different resource blocks (or subcarriers) in the subframe. This is said that the two resource blocks assigned to the PUCCH are frequency-hopped in a slot boundary. It is assumed herein that the PUCCH is assigned to the subframe for 4 UEs respectively in association with a PUCCH (m=0), a PUCCH (m=1), a PUCCH (m=2), and a PUCCH (m=3).

Hereinafter, a random access procedure will be described. The random access procedure is used when a UE acquires uplink synchronization with a BS or when an uplink radio resource is allocated to the UE. After power is turned on, the UE obtains downlink synchronization with an initial cell and receives system information. From the system information, the UE obtains a set of available random access preambles and information regarding resources used to transmit the random access preambles. The UE transmits a random access preamble randomly selected from the set of random access preambles. Upon receiving the random access preamble, the BS transmits a timing alignment (TA) value for uplink synchronization to the UE through a random access response. Accordingly, the UE obtains uplink synchronization.

<Random Access Procedure and CQI>

Figure 12:
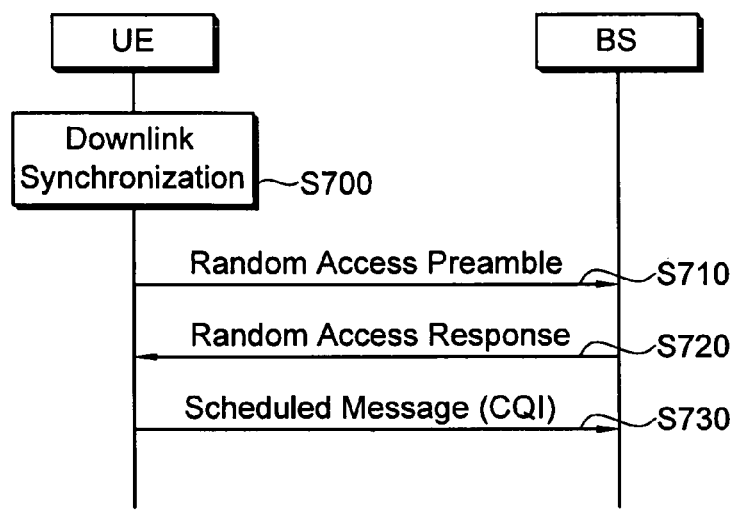
FIG. 12 is a flow diagram showing a random access procedure according to an embodiment of the present invention.

FIG. 12 is a flow diagram showing a random access procedure according to an embodiment of the present invention. The random access procedure can be performed when a UE acquires uplink synchronization with a BS or when the UE acquires an uplink radio resource.

Referring to FIG. 12, the UE first acquires downlink synchronization with the BS (step S700). The UE acquires downlink synchronization by using a primary synchronization signal and a secondary synchronization signal which are periodically transmitted by the BS.

The UE transmits a random access preamble to the BS by using a random access resource (step S710). The random access preamble may randomly be selected from a random access set which includes a plurality of available random access preambles. The random access set may be determined by using information received as a part of system information. Alternatively, the random access preamble may be predefined for the UE. It means that the UE transmit a dedicated random access preamble so that no contention occurs.

Upon receiving the random access preamble, the BS transmits a random access response to the UE through a downlink shared channel (DL-SCH) (step S720). The random access response may include a time alignment (TA) value for alignment of uplink time synchronization, an uplink radio resource assignment, a random access preamble identifier corresponding to the random access preamble, a cell-radio network temporary identifier (C-RNTI), etc. The TA value is used by the UE to adjust uplink synchronization. The random access preamble identifier is an identifier for the random access preamble received by the BS. The PDSCH which mapped to the DL-SCH is indicated by a PDCCH addressed by a random access identifier (i.e., a random access-radio network temporary identifier (RA-RNTI)). The RA-RNTI is masked with a cyclic redundancy check (CRC) of control information which is carried by a PDCCH. The UE monitors a set of PDCCH candidates. When no CRC error is detected after PDCCH decoding is performed, the UE receives PDSCH indicated by the detected PDCCH. In addition, the random access response may include a request for transmission of CQI and the radio resource assignment is used for the CQI transmission.

The UE transmits a scheduled message to the BS on a PUSCH by using the uplink radio resource assignment included in the random access response (step S730). When the UE transmits the scheduled message, the UE also transmits a CQI which represents a downlink channel condition. The UE can determine the CQI by receiving a downlink channel (e.g., a broadcast channel) since the UE has already obtained downlink synchronization. The scheduled message is a message transmitted by using the uplink radio resource assignment included in the random access response. For example, the scheduled message is a connection request message to establish RRC connection.

After receiving the scheduled message, the BS may transmit a contention resolution message. The contention resolution message is message to resolve contention between UEs when the random access procedure is initiated by using randomly selected random access preamble. When the UE successfully receives the contention resolution message, contention is resolved and thus an RRC connection is established. Then, the random access procedure is completed.

Although the random access preamble is randomly selected from the random access set, a plurality of UE can simultaneously transmit the same random access preambles by using the same random access-resources. This is called contention. In practice, the BS and each UE cannot detect occurrence of contention. After successfully receiving the contention resolution message, the UE can know that contention is resolved and thus the UE successfully accesses to the BS. If the UE does not receive the contention resolution message during a predetermined time period, the UE transmits a new random access preamble by regarding a random access as failure. Therefore, the contention resolution message must be successfully received to rapidly complete the random access procedure.

By transmission of the CQI, the BS can know downlink channel condition before transmitting the contention resolution message. Therefore, scheduling can be performed in a most suitable manner to successfully transmit the contention resolution message, and a reception failure rate of the contention resolution message can be decreased.

Although the CQI is transmitted together with the scheduled messages an example herein, the CQI may be transmitted independently from the scheduled message. In addition, the CQI may be transmitted at least one or more times periodically or non-periodically before the BS transmits the contention resolution message.

Various methods can be used to transmit the CQI. The CQI may be transmitted through a physical channel (i.e., PUSCH) by being configured in a physical layer, or may be transmitted through a UL-SCH by being configured in a MAC layer.

Figure 13:
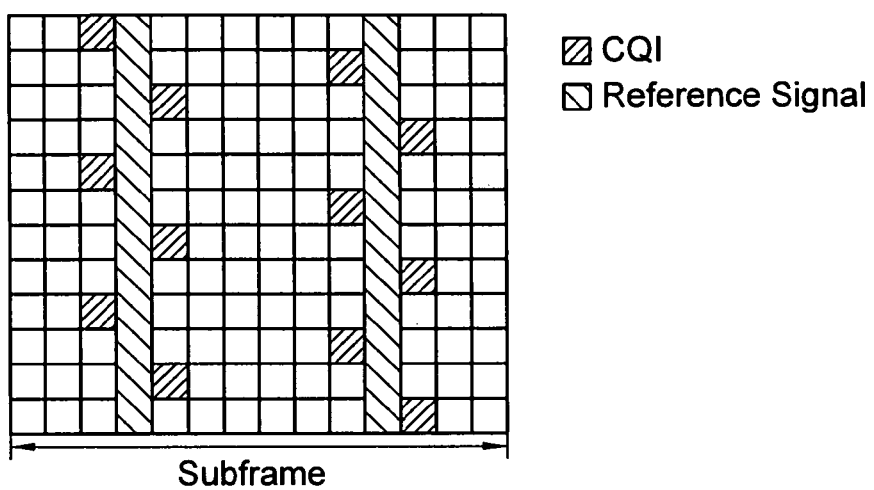
FIG. 13 shows an example of transmitting a channel quality indicator (CQI) on a physical uplink shared channel (PUSCH).

FIG. 13 shows an example of transmitting a CQI on a PUSCH. On a subframe consisting of 14 SC-FDMA symbols, a $4^{th}$ SC-FDMA symbol and an $11^{th}$ SC-FDMA symbol are allocated with reference signals. CQIs are allocated to resource elements on SC-FDMA symbols adjacent to the reference signals. By allowing the CQIs to be arranged near the reference signals, reliability of CQI transmission can be increased. The CQIs can be equidistantly distributed in a time domain and a frequency domain.

An interval or the number of resource elements to be allocated may differ according to a CQI amount, but the present invention is not limited thereto. In addition, the CQIs can be arranged in time-first mapping or frequency-first mapping. The frequency-first mapping means that the CQIs are arranged on resource elements allocated first along the frequency domain on one SC-FDMA symbol and thereafter, if resource elements are insufficiently, the CQIs are arranged on a next SC-FDMA symbol.

Figure 14:
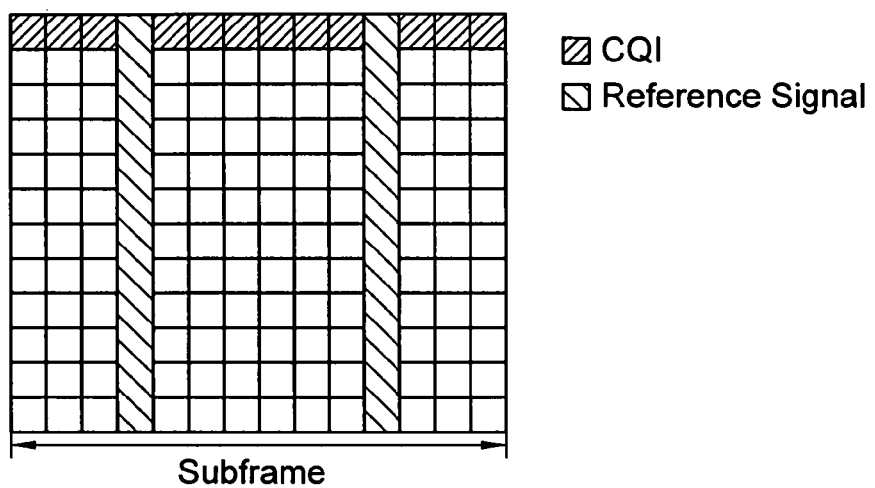
FIG. 14 shows another example of transmitting a CQI on a PUSCH.

FIG. 14 shows another example of transmitting a CQI on a PUSCH. Sequences which represent CQI are time-first mapped in a subframe. That is, the CQIs are firstly mapped to SC-FDMA symbols at same subcarrier. For example, it is supposed that both the CQI and a transport block are transmitted using one resource block. The transport block may carry the scheduled message. A sub-frame includes fourteen SC-FDMA symbols and two of the fourteen SC-FDMA symbols are used as references signals. Modulation symbols which represents the CQI are mapped one by one based on the SC-FDMA symbols. After CQI mapping is finished, the transport block is mapped to remained resource elements. Accordingly, the CQI and the transport block are multiplexed in a subframe. The multiplexed information is transmitted in the PUSCH. This can be called the scheduled message is transmitted along with CQI.

Figure 15:
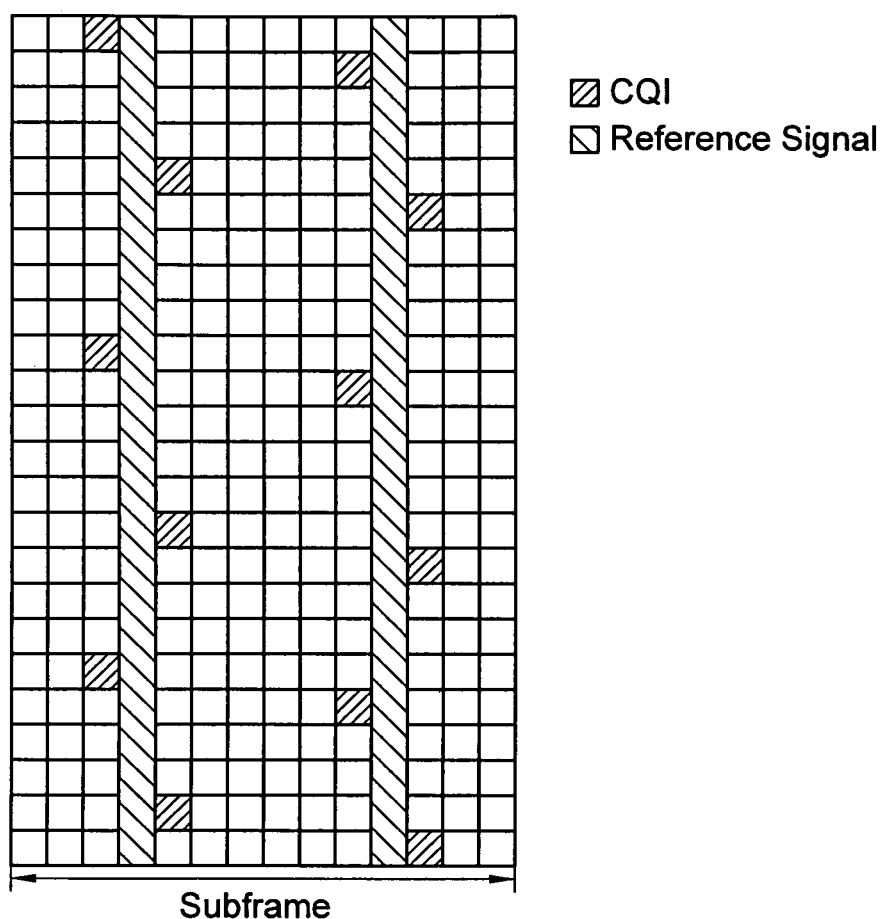
FIG. 15 shows another example of transmitting a CQI on a PUSCH.

FIG. 15 shows another example of transmitting a CQI on a PUSCH. Unlike the embodiment of FIG. 13 or 14, CQIs are transmitted throughout two resource blocks. The CQIs can be arranged with a much larger interval to reduce data loss in a frequency domain and a time domain. By doing so, a frequency diversity can be obtained. The interval of resource elements allocated with the CQIs may differ depending on the number of resource blocks to be allocated and an amount of CQI information.

Figure 16:
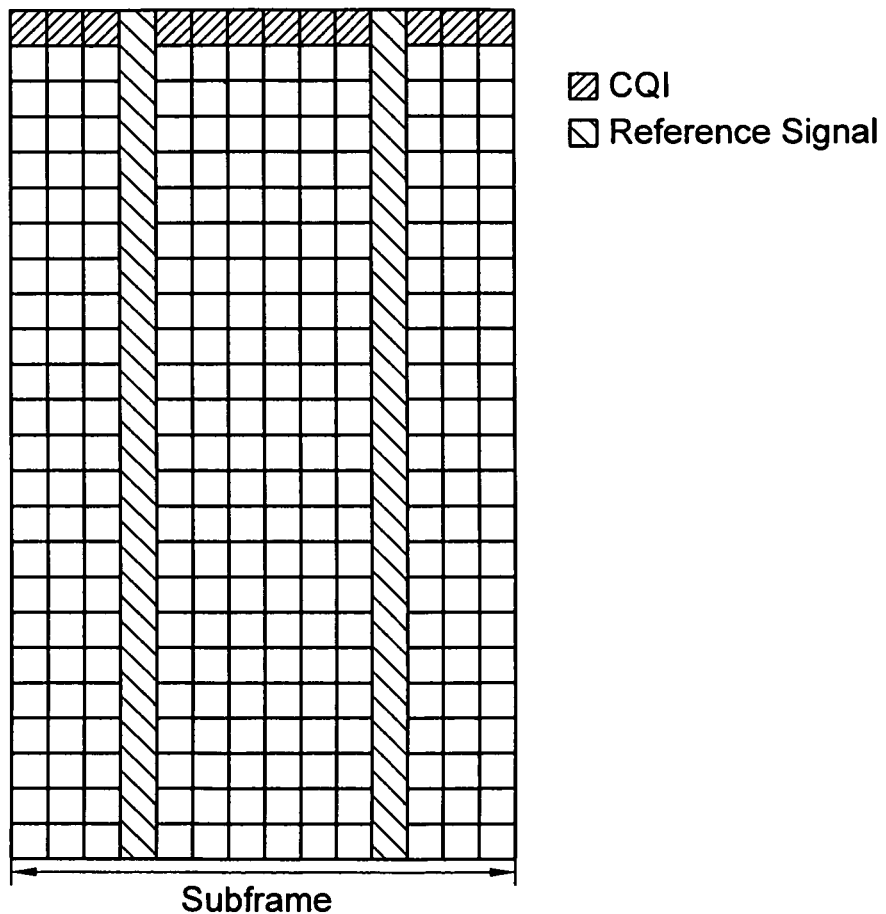
FIG. 16 shows another example of transmitting a CQI on a PUSCH.

FIG. 16 shows another example of transmitting a CQI on a PUSCH. CQIs are distributed on two resource blocks in a time-first mapping.

Figure 17:
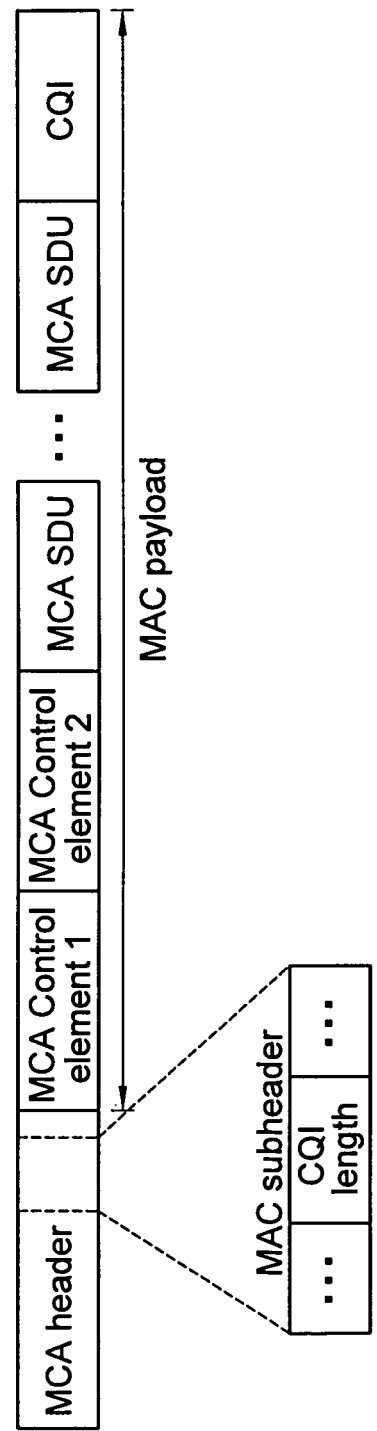
FIG. 17 shows an example of transmitting a CQI in a medium access control (MAC) layer.

FIG. 17 shows an example of transmitting a CQI in a MAC layer. To transmit the CQI on a PUSCH, data for a resource element allocated with the CQI has to be punctured. In this case, partial data loss may occur, and thus the CQI may be configured as a part of a MAC protocol data unit (PDU) in the MAC layer.

Referring to FIG. 17, a MAC PDU includes a MAC header and a CQI. The MAC PDU may further include a MAC service data unit (SDU) and a MAC control element. The MAC SDU is a data block delivered from an upper layer of the MAC layer. The MAC control element is used to deliver control information of the MAC layer such as a buffer status report. Although the CQI is appended to a part of the MAC PDU, the CQI may be located in another position.

To indicate whether the CQI is included in the MAC PDU, a subheader of the MAC header includes a CQI length. The MAC header is divided into at least one subheader. The subheader represents a length and property of the MAC SDU and each MAC control element. Whether the CQI is included or not can be reported using the subheader of the MAC header, and the CQI can be included in the MAC PDU when transmitted.

Figure 18:
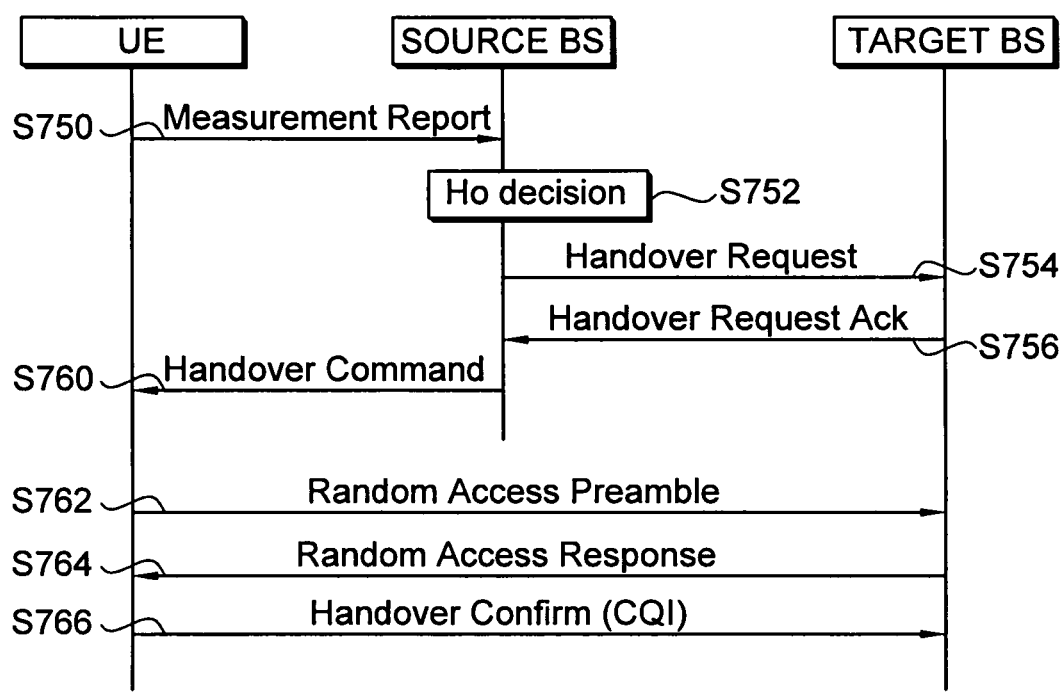
FIG. 18 is a flow diagram showing a method of performing a handover according to an embodiment of the present invention.

FIG. 18 is a flow diagram showing a method of performing a handover according to an embodiment of the present invention. When the UE is moving away from a serving BS, while approaching a new BS, there is a need to perform a process of changing an access point of the UE to the new BS over a network. The serving BS is referred to as a source BS. The new BS is referred to as a target BS. The process of changing the access point from the source BS to the target BS is referred to as handover.

Referring to FIG. 18, a UE sends a measurement report to a source BS (step S750). The source BS decides handover (HO) according to the measurement report (step S752). The source BS sends a handover request message to a target BS (step S754). The target BS sends a handover request ack message to confirm handover (step S756). The handover request ack message to confirm handover may include information on a dedicated random access preamble.

The source BS transmits a handover command message to the US (step S760). The handover command message may include information on the dedicated random access preamble. The US transmits the dedicated random access preamble to the target BS (step S762). The target BS transmits a random access response as a response of the dedicated random access preamble (step S764). The random access response may include an uplink radio resource assignment and a request for transmission of CQI. The UE transmits a handover confirm message with the CQI (step S766). The CQI may be multiplexed with the handover confirm message in a PUSCH.

By using the dedicated random access preamble, no contention occurs. It is possible to perform random access procedure quickly. Accordingly, transmission delay due to handover can be minimized. Also, CQI transmission during random access procedure enables the target BS to perform downlink scheduling just after handover is completed. The downlink scheduling by using the CQI may improve reliability of data transmission.

By transmission of CQI during a random access procedure, efficient downlink scheduling can be achieving just after the random access procedure is completed.

<Random Access Procedure and Sounding Reference Signal>

Figure 19:
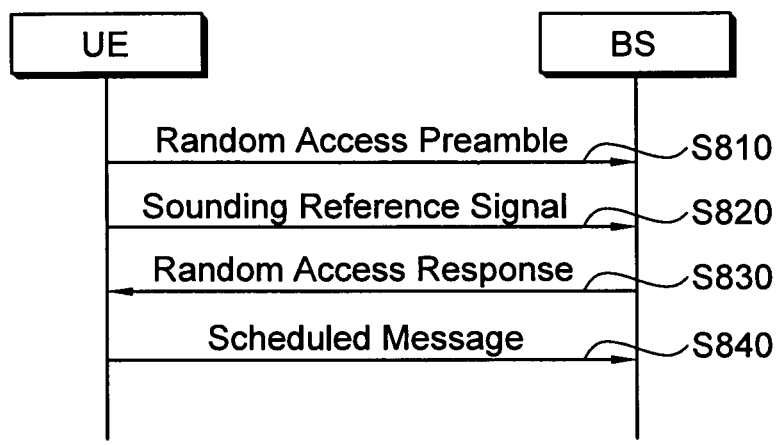
FIG. 19 is a flow diagram showing a method of performing a random access procedure according to an embodiment of the present invention.

FIG. 19 is a flow diagram showing a method of performing a random access procedure according to an embodiment of the present invention.

Referring to FIG. 19, a UE transmits a random access preamble to a BS by using a random access resource (step S810). The random access preamble may randomly be selected from a random access set. The UE transmits a sounding reference signal (SRS) to the BS simultaneously with or independently from the random access preamble (step S820). The SRS is a reference signal for uplink scheduling. The BS transmits a random access response including an uplink radio resource assignment in response to the random access preamble (step S830). The random access response is transmitted through a physical downlink shared channel (PDSCH). The PDSCH is indicated by a physical downlink control channel (PDCCH) indicated by an RA-RNTI. The BS can estimate an uplink channel condition by using the SRS. Thus, the BS can schedule uplink radio resources included in the random access response by considering the uplink channel condition. This means that the BS schedules the uplink radio resources during the random access procedure.

The UE receives the random access response and then transmits a scheduled message according to the radio resource assignment included in the random access response (step S840). After the BS receives the scheduled message which represents a connection request message, the BS may transmit a contention resolution message to the UE.

Figure 20:
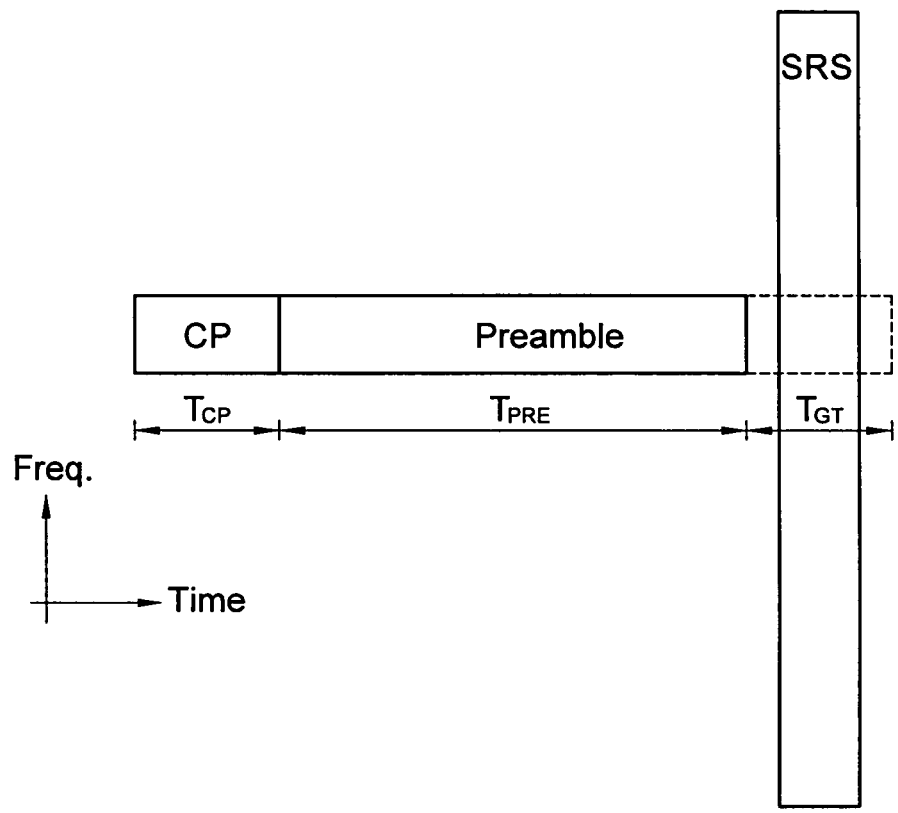
FIG. 20 is an exemplary diagram showing transmission of a random access preamble and a sounding reference signal (SRS).

FIG. 20 is an exemplary diagram showing transmission of a random access preamble and an SRS. It is shown that the random access preamble and the SRS are simultaneously transmitted in one subframe. The random access preamble is transmitted through a cyclic prefix (CP) duration $T_{CP}$ and a preamble duration $T_{PRE}$ in which a preamble sequence is transmitted. The CP duration $T_{CP}$ is a duration in which a CP is inserted to minimize interference caused by a multi-path channel, inter-symbol interference, etc. The preamble duration $T_{PRE}$ is a duration in which a sequence of random access preambles is carried. The preamble duration $T_{PRE}$ may be followed by a guard interval $T_{GT}$. For example, if a transmission time interval (TTI) of a subframe is 1.0 ms, the guard time $T_{GT}$ may be 0.2 ms. The SRS can be transmitted within the guard time $T_{GT}$. Although the guard time $T_{GT}$ is temporally posterior to the preamble duration $T_{PRE}$ herein, the guard time $T_{GT}$ may be temporally prior to the random access preamble.

If the UE transmits the SRS together with transmission of the random access preamble, the BS can know an uplink channel condition by using the SRS. The BS can allocate a band having a good channel condition to the UE when allocating an uplink radio resource for an RRC connection request message of the UE or when allocating a radio resource to the UE to which an RRC connection is established. In particular, radio resource scheduling can be further effectively achieved in an environment where a channel condition changes significantly depending on a frequency band.

Figure 21:
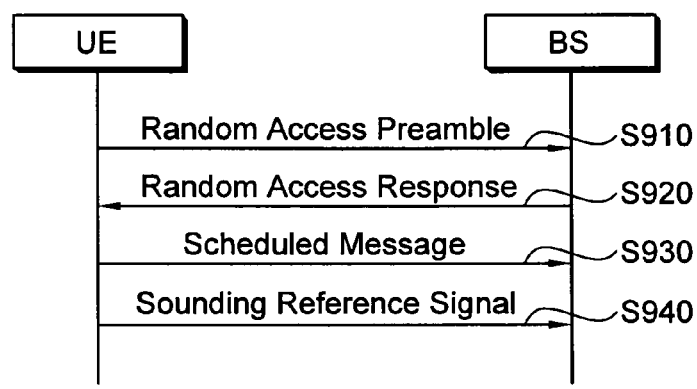
FIG. 21 is a flow diagram showing a method of performing a random access procedure according to another embodiment of the present invention.

FIG. 21 is a flow diagram showing a method of performing a random access procedure according to another embodiment of the present invention.

Figure 22:
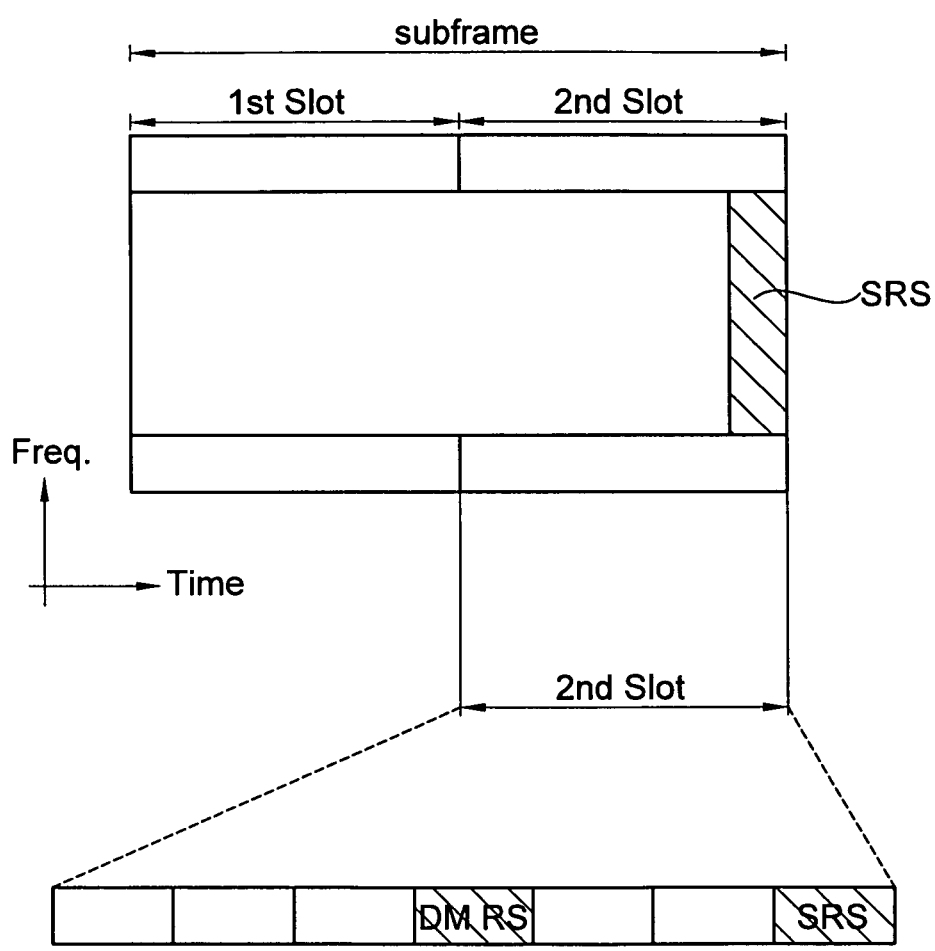
FIG. 22 is an exemplary diagram showing transmission of an SRS in a subframe.

Referring to FIG. 21, a UE transmits a random access preamble to a BS by using a random access resource (step S910). The BS transmits a random access response in response to the random access preamble (step S920). The random access response includes a TA value, an uplink radio resource assignment, etc. The UE receives the random access response and then transmits a scheduled message by using the radio resource assignment included in the random access response (step S930). Further, the UE transmits an SRS simultaneously with or independently from the random access preamble (step S940). The SRS may be transmitted at a last SC-FDMA symbol of a subframe. The SRS transmitted together with the scheduled message can be used for the purpose of scheduling for the uplink radio resource assignment after an RRC connection is established between the UE and the BS. FIG. 22 is an exemplary diagram showing transmission of an SRS in a subframe. The SRS may be transmitted at a last SC-FDMA symbol of the subframe. The SRS may be transmitted through a data region other than a control region.

When one slot includes 7 SC-FDMA symbols, a demodulation reference signal (DM RS) for data demodulation is transmitted at a 4$^{th}$ SC-FDMA symbol of the slot on a PUSCH.

Although it has been described herein that the SRS is mapped to the data region, that is, the last OFDM symbol, the SRS can be mapped throughout the data region and the control region.

After an RRC connection is established, the UE transmits the SRS to the BS periodically or in an event-driven manner so that the BS can know an uplink channel condition. However, until the RRC connection is established, the BS allocates an uplink radio resource to the UE without knowing the uplink channel condition. If the UE transmits the SRS before the RRC connection is established during a random access procedure, the BS can schedule initial uplink radio resources to be allocated to the UE by considering the uplink channel condition. The BS can perform further reliable radio resource scheduling for a UL-SCH.

<Random Access Procedure and RA-RNTI>

Figure 23:
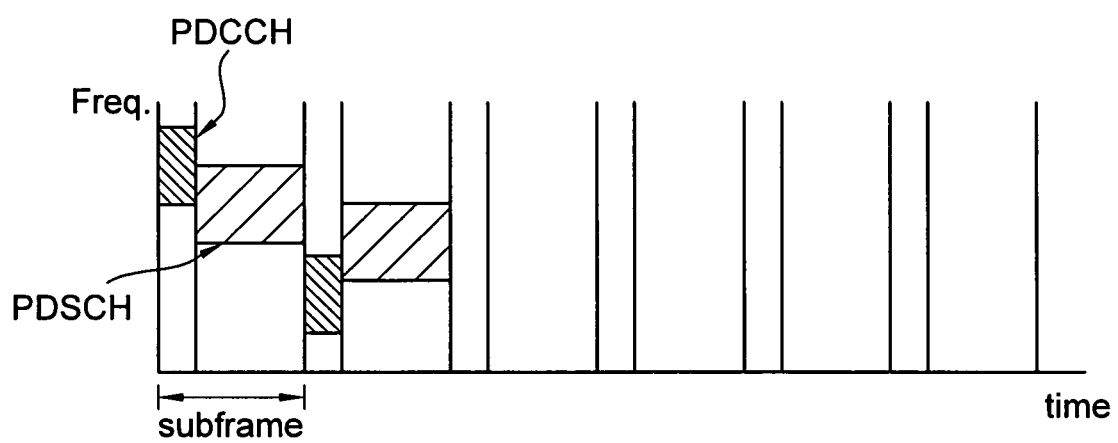
FIG. 23 is an exemplary diagram showing transmission of downlink data in a 3GPP LTE.

FIG. 23 is an exemplary diagram showing transmission of downlink data in a 3GPP LTE. A BS transmits general user data on a physical channel (i.e., PDSCH) mapped to a transport channel (i.e., DL-SCH). A PDCCH includes downlink radio resource assignment information regarding the PDSCH. A UE first obtains control information on the PDCCH, and then determines how to receive and decode the PDSCH in a corresponding subframe from the radio resource assignment information included in the control information. To configure the PDCCH, the BS first determines a PDCCH format according to the control information to be transmitted to the UE, and appends a cyclic redundancy check (CRC) to the control information. The CRC is masked with a unique identifier (referred to as a radio network temporary identifier (RNTI)) according to a usage or owner of the PDCCH. The identifier has a size of 16 bits in general, and can express from 0 to 65536. If the PDCCH is for a specific UE, a unique identifier (e.g., cell-RNTI (C-RNTI)) of the UE can be masked on the CRC. If the PDCCH is for paging information, a paging indication identifier (e.g., paging indication-RNTI (PI-RNTI)) can be masked on the CRC. If the PDCCH is for system information, a system information identifier (e.g., system information-RNTI (SI-RNTI)) can be masked on the CRC. To indicate a random access response that is a response for transmission of the random access preamble of the UE, a random access-RNTI (RA-RNTI) can be masked on the CRC.

For example, assume that the PDCCH has a CRC masked with a C-RNTI 'A' and transmits a random access response 'B' on the PDSCH. When the UE performs the random access procedure, the UE transmits a random access preamble and then monitors the PDCCH by using the RA-RNTI. Monitoring is an operation for detecting a CRC error by decoding the PDCCH. If there is no CRC error, the UE receives the random access response 'B' on the PDSCH indicated by the PDCCH. If the random access response 'B' includes a random access preamble identifier of the UE, it means that the UE confirms that the random access response B is a random access response of the UE.

The UE needs to rapidly and correctly receive the random access response of the UE so that the random access procedure operates in a rapid and reliable manner. For this, the UE effectively configures the RA-RNTI used to identify the PDCCH of the UE.

Figure 24:
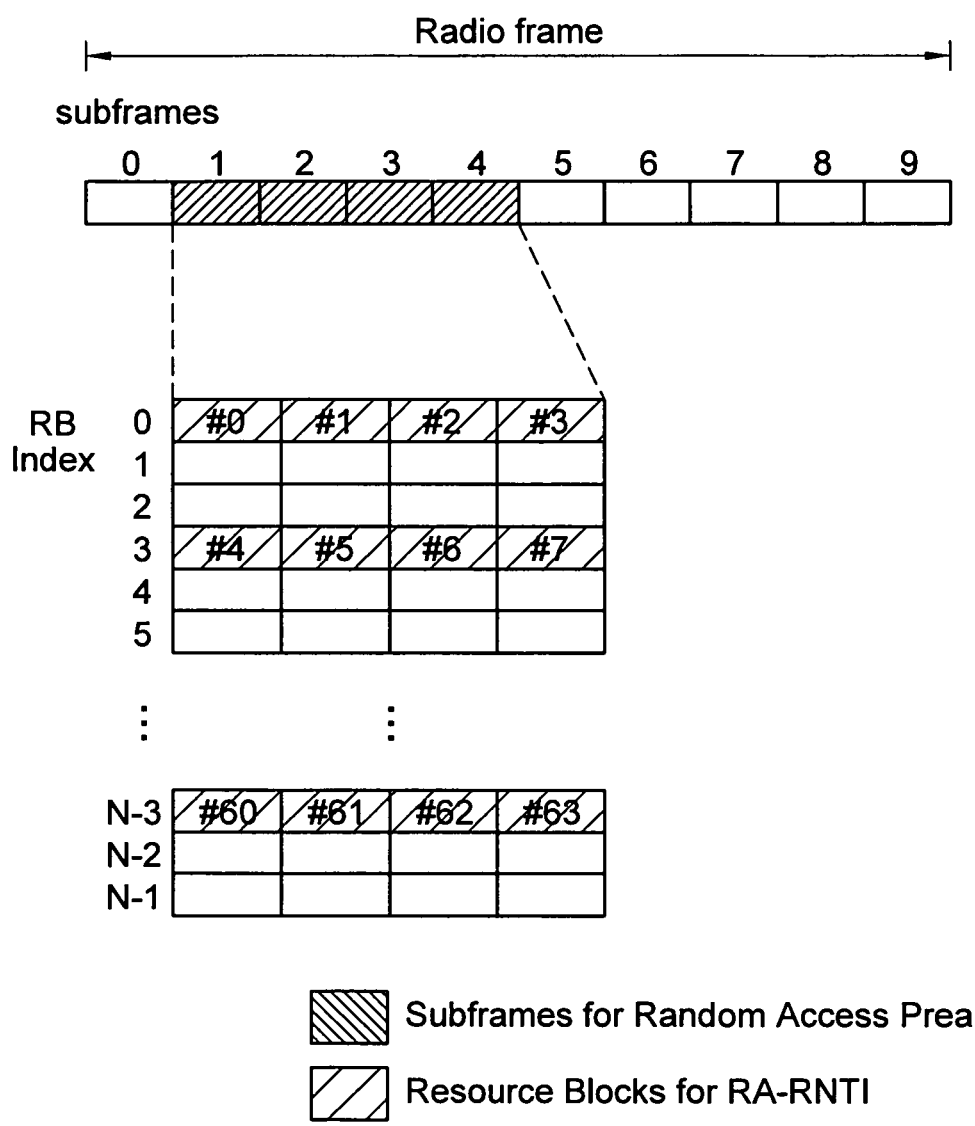
FIG. 24 is an exemplary diagram showing a method of determining a random access-radio network temporary identifier (RA-RNTI) according to an embodiment of the present invention.

FIG. 24 is an exemplary diagram showing a method of determining an RA-RNTI according to an embodiment of the present invention.

Referring to FIG. 24, a UE can transmit a random access preamble at a subframe of a radio frame. The number of subframes can be set to a specific number according to a bandwidth used by a BS. The subframe that can transmit the random access preamble may be a subframe at which a random access resource is located. Herein, four subframes are allowed to transmit the random access preamble in one radio frame. The subframes used to transmit the random access preamble in the radio frame can be arranged with a predetermined interval. That is, the random access response can be arranged with a predetermined period.

Assume that four subframes are used to transmit the random access preamble in the radio frame, and the random access resource is allocated to the subframes indexed from 1 to 4. In addition, assume that the random access resource uses one resource block (RB). The UE can transmit the random access preamble by using the random access resource at the subframe indexed with 1.

The RA-RNTI is related to the random access resource by which the random access preamble is transmitted. For example, the RA-RNTI can correspond to a location of the random access resource transmitted by the UE. When the UE transmits the random access response at the subframe indexed with 1, the BS can transmit the random access response through a subframe subsequent to the subframe indexed with 1. In this case, the RA-RNTI that identifies the PDCCH indicating the PDSCH through which the random access response is transmitted may one-to-one correspond to an index of the random access resource in the subframe indexed with 1.

If the subframe includes N RBs (where N is an integer greater than 1, i.e., N>1), an RB index ranges from 0 to N−1. Thus, when one random access response corresponds to one RB, it can be seen that N×4 random access resources are present throughout four subframes. When 64 random access preambles belong to a set of random access preambles usable by the UE, the 64 random access resources can respectively correspond to the 64 random access preambles. For example, in a system using a bandwidth of a 10 MHz, one subframe generally includes 50 RBs, and four subframes have 200 RBs. 64 RBs selected from the 200 RBs can be designated as random access resources corresponding to the respective random access preambles. When the random access resource is expressed in a form of (subframe index, RB index), random access resources corresponding to random access preambles #0, #1, #2, #3, ..., #62, #63 can be respectively expressed by (1,0), (2,0), (3,0), (4,0), ..., (3, N-3), (1, N-3). When the UE transmits the random access preamble #3 by using the random access resource (4,0), the UE and the BS can determine the RA-RNTI from the random access resource without additional signaling. This is because the UE knows the random access resource selected by the UE itself, and the BS knows the random access resource used by the received random access preamble. The UE can obtain the RA-RNTI to be used by the UE itself by using a subframe index and a resource index. The UE can confirm the random access response through the PDCCH identified by the RA-RNTI.

Since the UE and the BS determine the RA-RNTI according to a mutually agreed rule, additional signaling for the RA-RNTI is unnecessary.

When the UE transmits the random access preamble through the subframe indexed with 4 and then does not receive the PDCCH identified by the RA-RNTI in a subsequent subframe, the UE can transmit the random access preamble through the subframe indexed with 1 in a next radio frame.

Although it has been described herein that the subframe at which the random access preamble is transmitted is consecutive to the subframe at which the random access response can be transmitted, the random access response may be transmitted through a subframe which is delayed by a predetermined time after the random access preamble is transmitted. The position and number of subframes at which the random access preamble is transmitted in the radio frame are for exemplary purposes only, and thus the present invention is not limited thereto. In a multi-cell environment, the position of the subframe at which the random access preamble is transmitted may differ between consecutive cells.

Figure 25:
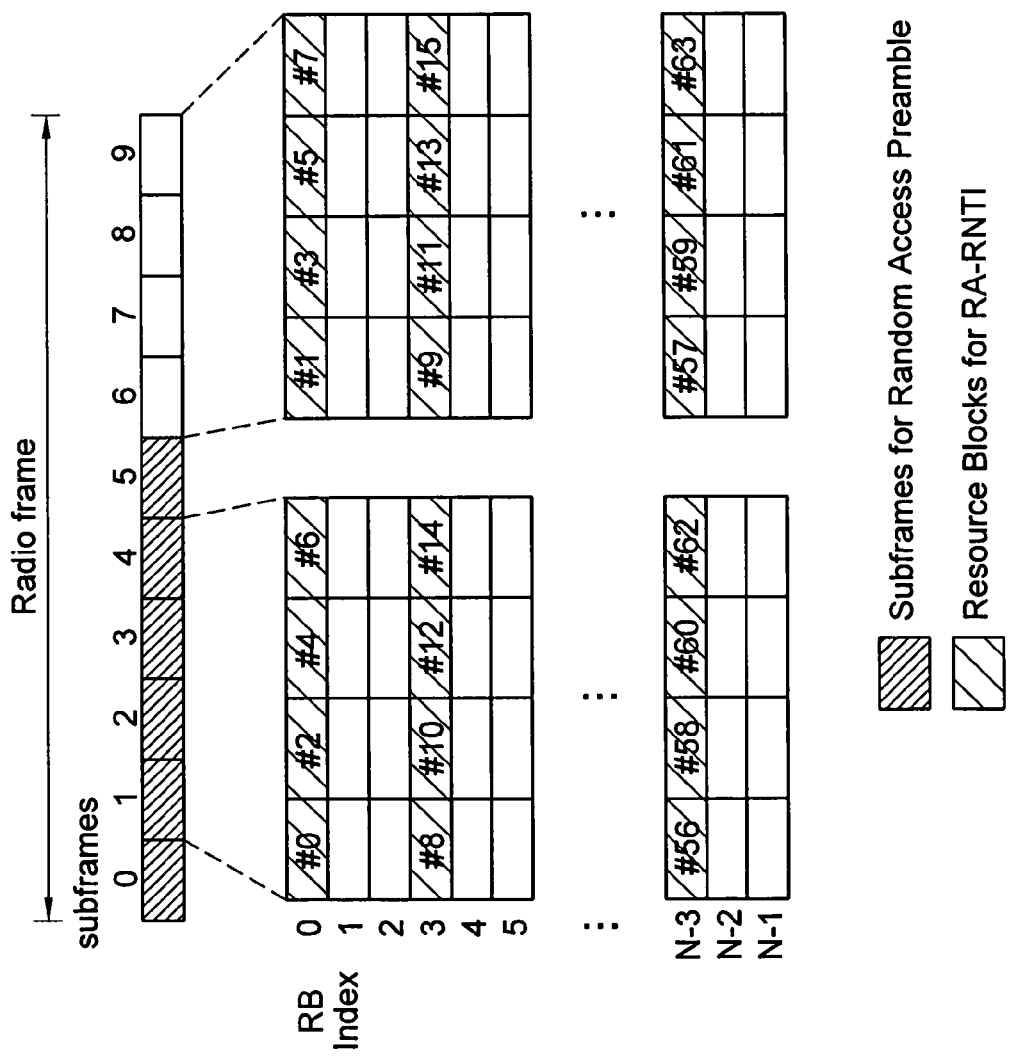
FIG. 25 is an exemplary diagram showing a method of determining an RA-RNTI according to another embodiment of the present invention.

FIG. 25 is an exemplary diagram showing a method of determining an RA-RNTI according to another embodiment of the present invention.

Referring to FIG. 25, a random access resource can be divided into two groups according to a random access preamble number. For example, if the random access preamble number is odd, a random access preamble can be transmitted through subframes indexed from 1 to 4, and if the random access preamble number is even, the random access preamble can be transmitted through subframes indexed from 6 to 9. There is no restriction on the position and number of subframes used to transmit the random access preamble. A method of transmitting a random access preamble by using a subframe used to transmit the random access preamble can be applied in various manners. Random access preambles numbered from #0 to #31 can be transmitted through the subframes indexed from 1 to 4. Random access preambles numbered from #32 to #63 can be transmitted through subframes indexed from 6 to 7. As such, the random access preambles can be transmitted in various manners.

The subframes indexed from 1 to 4 may be assigned to random access resources corresponding to random access preambles numbered with even numbers. The subframes indexed from 6 to 9 may be assigned to random access resources corresponding to random access preambles numbered with odd numbers.

The RA-RNTI may be determined according to a subframe index at which the random access preamble is transmitted and an index of a random access resource in that subframe. The UE can obtain the RA-RNTI by using a subframe used by the UE to transmit the random access preamble and a position of the random access resource in that subframe. By using the RA-RNTI, the UE can receive a random access response of the UE itself. Since the random access resource used by the random access preamble is known to both the BS and the UE, the BS and the UE can know the RA-RNTI without additional signaling.

Figure 26:
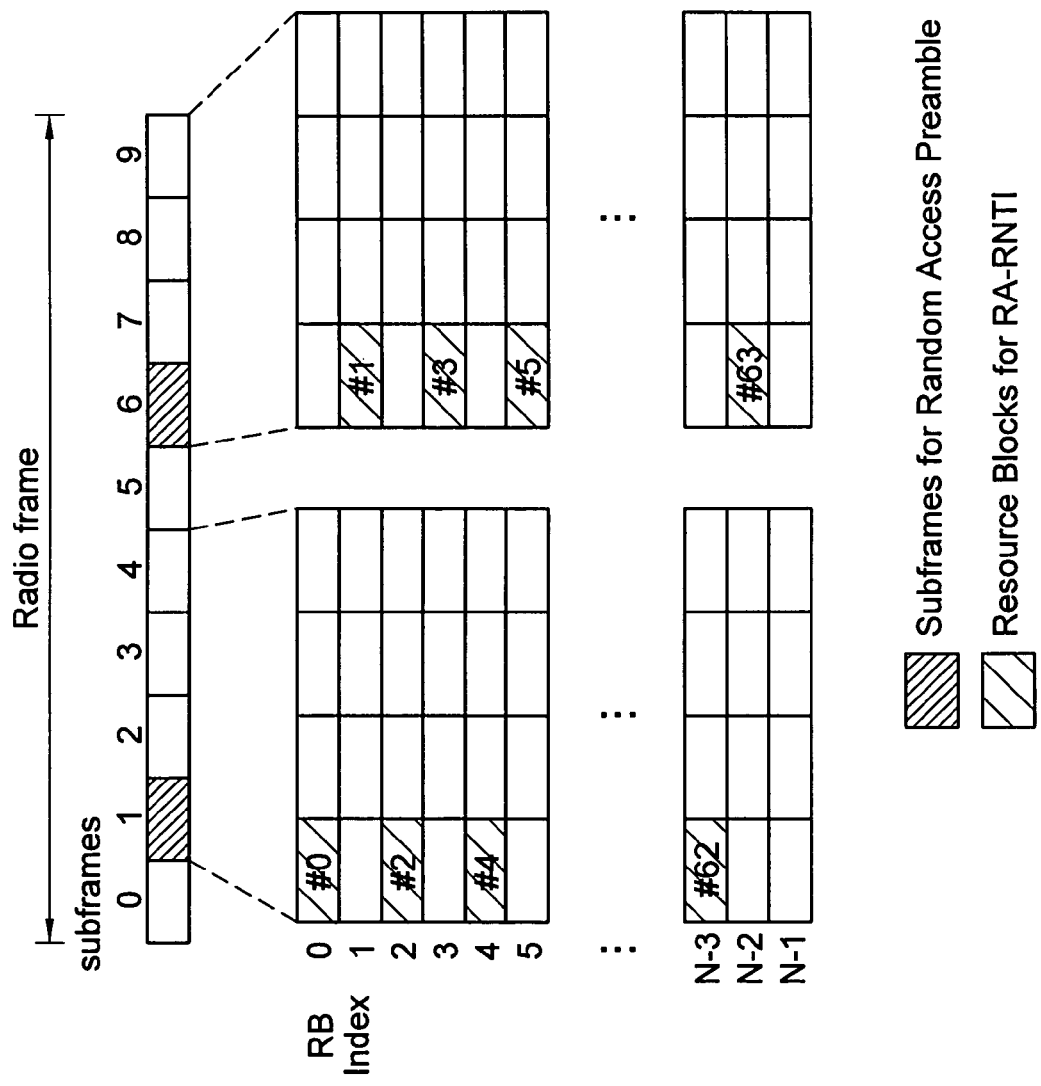
FIG. 26 is an exemplary diagram showing a method of determining an RA-RNTI according to another embodiment of the present invention.

FIG. 26 is an exemplary diagram showing a method of determining an RA-RNTI according to another embodiment of the present invention.

Referring to FIG. 26, a radio frame is configured such that random access preambles numbered with even numbers are transmitted through a subframe indexed with 1 and random access preambles numbered with odd numbers are transmitted through a subframe indexed with 6. A random access response for the random access preambles transmitted through the subframe indexed with 1 can be received through any one of subsequent subframes indexed from 2 to 4. A random access response for the random access preambles transmitted through the subframe indexed with 6 can be received through any one of subsequent subframes indexed from 7 to 9. The UE can obtain the RA-RNTI by using a subframe index at which the random access preamble is transmitted and an index of a random access resource in that subframe, and can receive the random access response on a PDSCH that is indicated by a PDCCH identified by the RA-RNTI.

Without additional signaling, a random access identifier which is included in a random access response can be determined. A failure rate of the random access procedure can be decreased. Therefore, a service delay can be avoided when an initial access or a handover is performed.

The present invention can be implemented with hardware, software, or combination thereof. In hardware implementation, the present invention can be implemented with one of an application specific integrated circuit (ASIC), a digital signal processor (DSP), a programmable logic device (PLD), a field programmable gate array (FPGA), a processor, a controller, a microprocessor, other electronic units, and combination thereof, which are designed to perform the aforementioned functions. In software implementation, the present invention can be implemented with a module for performing the aforementioned functions. Software is storable in a memory unit and executed by the processor. Various means widely known to those skilled in the art can be used as the memory unit or the processor.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of performing a random access procedure in a wireless communication system, the method performed by a user equipment and comprising:
   transmitting a random access preamble to a base station;
   receiving a random access response grant from the base station in response to the random access preamble, wherein the random access response grant comprises an uplink resource assignment; and
   transmitting, in response to the random access response grant, a scheduled message including a Channel Quality Indicator (CQI) to the base station via a Physical Uplink Shared Channel (PUSCH),
   wherein the uplink resource assignment is used for scheduling of the PUSCH,
   wherein the scheduled message and the CQI are transmitted via a same subframe, and
   wherein the CQI is aperiodically transmitted to the base station.

2. The method of claim 1, wherein the random access response grant is received on a Physical Downlink Shared Channel (PDSCH).

3. The method of claim 2 further comprising:
   receiving control information via a Physical Downlink Control Channel (PDCCH);
   verifying the control information by demasking a cyclic redundancy code (CRC) of the control information with a Random Access-Radio Network Temporary Identifier (RA-RNTI); and
   identifying the location of the random access response grant in the PDSCH using the control information.

4. The method of claim 1, wherein the CQI is mapped on a radio block which is initially transmitted in a subframe.

5. In a wireless communication system, user equipment comprising:
- a Radio Frequency (RF) unit for transmitting and receiving radio signals; and
- a processor coupled with the RF unit and configured to:
  - transmit a random access preamble to a base station;
  - receive a random access response grant from the base station in response to the random access preamble, wherein the random access response grant comprises an uplink resource assignment; and
  - transmit, in response to the random access response grant, a scheduled message including a Channel Quality Indicator (CQI) to the base station via a Physical Uplink Shared Channel (PUSCH),
  - wherein the uplink resource assignment is used for scheduling of the PUSCH,
  - wherein the scheduled message and the CQI are transmitted via a same subframe, and
  - wherein the CQI is aperiodically transmitted to the base station.

6. The user equipment of claim 5, wherein the random access response grant is received on a Physical Downlink Shared Control Channel (PDSCH).

7. The user equipment of claim 5, wherein the CQI is mapped on a radio block which is initially transmitted in a subframe.

8. The user equipment of claim 5, wherein the random access preamble is a dedicated random access preamble.

* * * * *